(12) United States Patent
Iwahara et al.

(10) Patent No.: US 9,630,572 B2
(45) Date of Patent: Apr. 25, 2017

(54) CLIP

(71) Applicant: DAIWA KASEI KOGYO KABUSHIKI KAISHA, Okazaki-shi, Aichi-ken (JP)

(72) Inventors: Toshio Iwahara, Okazaki (JP); Kazuhiro Banno, Kariya (JP); Syouji Yamashita, Toyota (JP)

(73) Assignee: DAIWA KASEI KOGYO KABUSHIKI KAISHA, Aichi-ken (JP)

(*) Notice: Subject to any disclaimer, the term of this patent is extended or adjusted under 35 U.S.C. 154(b) by 218 days.

(21) Appl. No.: 14/297,173

(22) Filed: Jun. 5, 2014

(65) Prior Publication Data
US 2014/0363224 A1 Dec. 11, 2014

(30) Foreign Application Priority Data

Jun. 7, 2013 (JP) .................................. 2013-120989

(51) Int. Cl.
*F16B 5/06* (2006.01)
*B60R 13/02* (2006.01)
*F16B 21/07* (2006.01)

(52) U.S. Cl.
CPC .......... *B60R 13/0206* (2013.01); *F16B 5/065* (2013.01); *F16B 5/0657* (2013.01); *F16B 5/0664* (2013.01); *F16B 21/075* (2013.01); *Y10T 403/60* (2015.01)

(58) Field of Classification Search
CPC ....... Y10T 24/30; Y10T 24/42; Y10T 24/309; F16B 5/065; F16B 5/0621; F16B 5/06; F16B 5/0664; F16B 5/0657; F16B 19/10; F16B 19/1081; F16B 21/00; F16B 21/065; F16B 2/20; F16B 2/22
See application file for complete search history.

(56) References Cited

U.S. PATENT DOCUMENTS

| | | | |
|---|---|---|---|
| 2005/0116485 A1 | 6/2005 | Kuroda | |
| 2005/0155191 A1* | 7/2005 | Asano | B60R 13/0206 24/297 |
| 2006/0079316 A1* | 4/2006 | Flemming | G07F 17/32 463/25 |

FOREIGN PATENT DOCUMENTS

| | | | | |
|---|---|---|---|---|
| DE | 4428142 | * | 2/1996 | ................. F16B 2/22 |
| GB | 2 381 289 A | | 4/2003 | |
| JP | 2001-271811 A | | 10/2001 | |
| WO | WO 2010/104653 A1 | | 9/2010 | |

* cited by examiner

*Primary Examiner* — Jack W Lavinder
(74) *Attorney, Agent, or Firm* — Christensen, Fonder, Dardi & Herbert PLLC

(57) ABSTRACT

A clip may have a clip body configured to be attached to a rib formed in an attaching article and configured to be inserted into an attaching hole formed in an object panel. The clip body includes a clamping portion configured to be coupled to the rib via an engagement slot formed in the rib, and an engagement portion elastically engageable with the attaching hole. The engagement portion has a biasing body that is configured to elastically contact an outer surface of the rib when the engagement portion is deformed inwardly caused by an extraction load applied to the clip body. The biasing body is positioned so as to contact the outer surface of the rib in a position closer to a distal end of the rib than the engagement slot.

6 Claims, 18 Drawing Sheets

CLIP

PRIORITY CLAIM

The present application claims priority to Japanese Patent Application No. 2013-120989 filed on Jun. 7, 2013, which said application is incorporated by reference in its entirety herein.

BACKGROUND OF THE INVENTION

Field of the Invention

Embodiments of the present invention relate to a clip. More particularly, some embodiments relate to a clip for attaching an attaching article (e.g., a center cluster) to an object panel (e.g. an instrument panel).

Description of Related Art

A clip having a clip body is already known. The known clip is configured to detachably attach a center cluster (an attaching article) to an instrument panel (an object panel) of an automobile by inserting the clip body into an attaching hole formed in the instrument panel. The clip body is previously attached to a rib of a clip attaching base formed in the center cluster. Generally, the clip body is composed of two parts. The first is a clumping portion (for example, a pair of clamping strips) that is engageable with the rib of the center cluster via an engagement slot formed in the rib. The second is an elastically deformable engagement portion (for example, a pair of engagement legs) that is positioned in an outer side of the clumping portion. The clip body may be integrally formed by using synthetic resin having rigidity.

Such a clip is taught, for example, by JP 2001-271811A. As shown in FIGS. 14-17, a clip 501 taught therein has a U-shaped clip body 510 having an engagement portion 516. The clip body 510 has a clamping portion 514 formed therein. The clamping portion 514 is positioned in the engagement portion 516 and has a pair of engagement claws 514b (FIG. 15). The engagement claws 514b are arranged and constructed to engage an engagement slot 524a formed in a rib 524 of a center cluster 502 when the clip body 510 is attached to the rib 524. Further, the engagement portion 516 has a pair of elastic strips 516d that are formed in inner surfaces thereof.

In order to attach the center cluster 502 to an instrument panel 503 using the clip 501, the clip body 510 is first attached to the rib 524 of the center cluster 502 while the engagement claws 514b of the clamping portion 514 engage the engagement slot 524a formed in the rib 524. Thereafter, the clip body 510 attached to the rib 524 of the center cluster 502 is pushed into an attaching hole 530 formed in the instrument panel 503. As a result, the clip body 510 can be introduced into the attaching hole 530 while the engagement portion 516 is elastically flexed. As shown in FIG. 17, when the clip body 510 can be sufficiently inserted into the attaching hole 530, the engagement portion 516 elastically engages the attaching hole 530, so as to be securely held in the attaching hole 530. Thus, the clip body 510 can be attached to the instrument panel 503 by an elastic biasing force of the engagement portion 516. As a result, the center cluster 502 can be attached to the instrument panel 503 via the clip 501.

Generally, when the engagement portion 516 is continuously flexed by the attaching hole 530 of the instrument panel 503 for a long period of time, elasticity of the engagement portion 516 can be reduced or lost due to a heat creep phenomenon (a phenomenon specific to synthetic resin). Resultantly, a connecting force of the clip body 510 to the instrument panel 503 (i.e., a force connecting the clip body 510 to the instrument panel 503) can be reduced. Therefore, when an attached condition of the clip body 510 to the instrument panel 503 is maintained for a long period of time (i.e., a condition in which the center cluster 502 is attached to the instrument panel 503 via the clip 501 is maintained for a long period of time), the elasticity of the engagement portion 516 can be reduced. As a result, an engaging force of the engagement portion 516 to the instrument panel 503 (i.e., a force for causing the engagement portion 516 to engage the instrument panel 503) can be reduced. However, in the attached condition of the clip body 510, the elastic strips 516d formed in the engagement portion 516 are spaced from (do not contact) the rib 524 (FIG. 17). That is, the elastic strips 516d are not elastically flexed. Therefore, even if the attached condition of the clip body 510 is maintained for a long period of time, the elastic strips 516d cannot be subjected to the heat creep phenomenon. As a result, elasticity of the elastic strips 516d cannot be reduced.

When an extraction load is applied to the clip body 510 after the clip body 510 is attached for a prolonged period of time (i.e., after the heat creep phenomenon occurs in the engagement portion 516), the engagement portion 516 can be easily deformed because the elasticity thereof is reduced. However, as shown in FIG. 18, at this time, the elastic strips 516d can elastically contact the outer surface of the rib 524. Therefore, elastic biasing forces of the elastic strips 516d can act on the outer surface of the rib 524, so that reactive forces of the elastic biasing forces of the elastic strips 516d can act on the engagement portion 516 from the rib 524. The reactive forces of the elastic biasing forces of the elastic strips 516d can function to prevent the engagement portion 516 from being deformed. That is, the reactive forces of the elastic biasing forces of the elastic strips 516d can function as a new or additional engaging force of the engagement portion 516 to engage the instrument panel 503 (i.e., an additional force for causing the engagement portion 516 to engage the instrument panel 503). As a result, the connecting force of the clip body 510 to the instrument panel 503 can be effectively prevented from being reduced. Thus, the attached condition of the clip body 510 to the instrument panel 503 can be securely maintained. Therefore, even when the extraction load is applied to the clip body 510 in a condition in which the elasticity of the engagement portion 516 is reduced due to the heat creep phenomenon, the attached condition of the clip body 510 to the instrument panel 503 can be maintained.

However, in JP 2001-271811 A, the elastic strips 516d are configured to contact the outer surface of the rib 524 of the center cluster 502 in a portion 524b closer to a proximal end of the rib 524 than the engagement slot 524a (i.e., in a portion 524b lower than the engagement slot 524a) when the engagement portion 516 is elastically flexed inwardly due to the extraction load applied to the clip body 510 (FIG. 18). This means that the engagement slot 524a must be formed in a limited range between distal and proximal (upper and lower) ends of the rib 524. That is, the engagement slot 524a must be formed as a closed ended slot. Therefore, when the center cluster 502 having the rib 524 is formed by injection molding, it is necessary to use a slide die in combination with an injection molding die in order to form the engagement slot 524a in the rib 524. This may lead to increased costs for manufacturing the center cluster 502.

Thus, there is a need in the art for improved clips.

BRIEF SUMMARY OF THE INVENTION

For example, in one aspect of the present invention, a clip may have a clip body configured to be attached to a rib formed in an attaching article and configured to be inserted into an attaching hole formed in an object panel. The clip body includes a clamping portion configured to be coupled to the rib via an engagement slot formed in the rib, and an engagement portion elastically engageable with the attaching hole. The engagement portion has a biasing body that is configured to elastically contact an outer surface of the rib when the engagement portion is deformed inwardly caused by an extraction load applied to the clip body. The biasing body is positioned so as to contact the outer surface of the rib in a position closer to a distal end of the rib than the engagement slot.

According to an aspect of the present invention, even when elasticity of the engagement portion is reduced due to heat creep phenomenon, a reactive force of an elastic biasing force of the at least one biasing body can function as a new or additional engaging force of the engagement portion to the object panel (i.e., a force for causing the engagement portion to engage the object panel). Therefore, even when the extraction load is applied to the clip body after the elasticity of the engagement portion is reduced, the clip body can be effectively prevented from being removed from the attaching hole of the instrument panel. That is, even when elasticity of the engagement portion is reduced, a connecting force of the clip body to the object panel (i.e., a force connecting the clip body to the object panel) can be effectively prevented from being reduced. Thus, an attached condition of the clip body to the object panel can be securely maintained.

Further, the at least one biasing body may contact the outer surface of the rib in the position closer to the distal end of the rib than the engagement slot. Therefore, the engagement slot of the rib can be formed as an elongated open ended slot that extends to a proximal end of the rib and opens therein. Therefore, when the attaching article having the rib is formed by injection molding, it is not necessary to use a slide die in combination with an injection molding die in order to form the engagement slot in the rib.

Other objects, features and advantages of the present invention will be readily understood after reading the following detailed description together with the accompanying drawings and the claims.

DETAILED DESCRIPTION OF THE INVENTION

Figure 1:
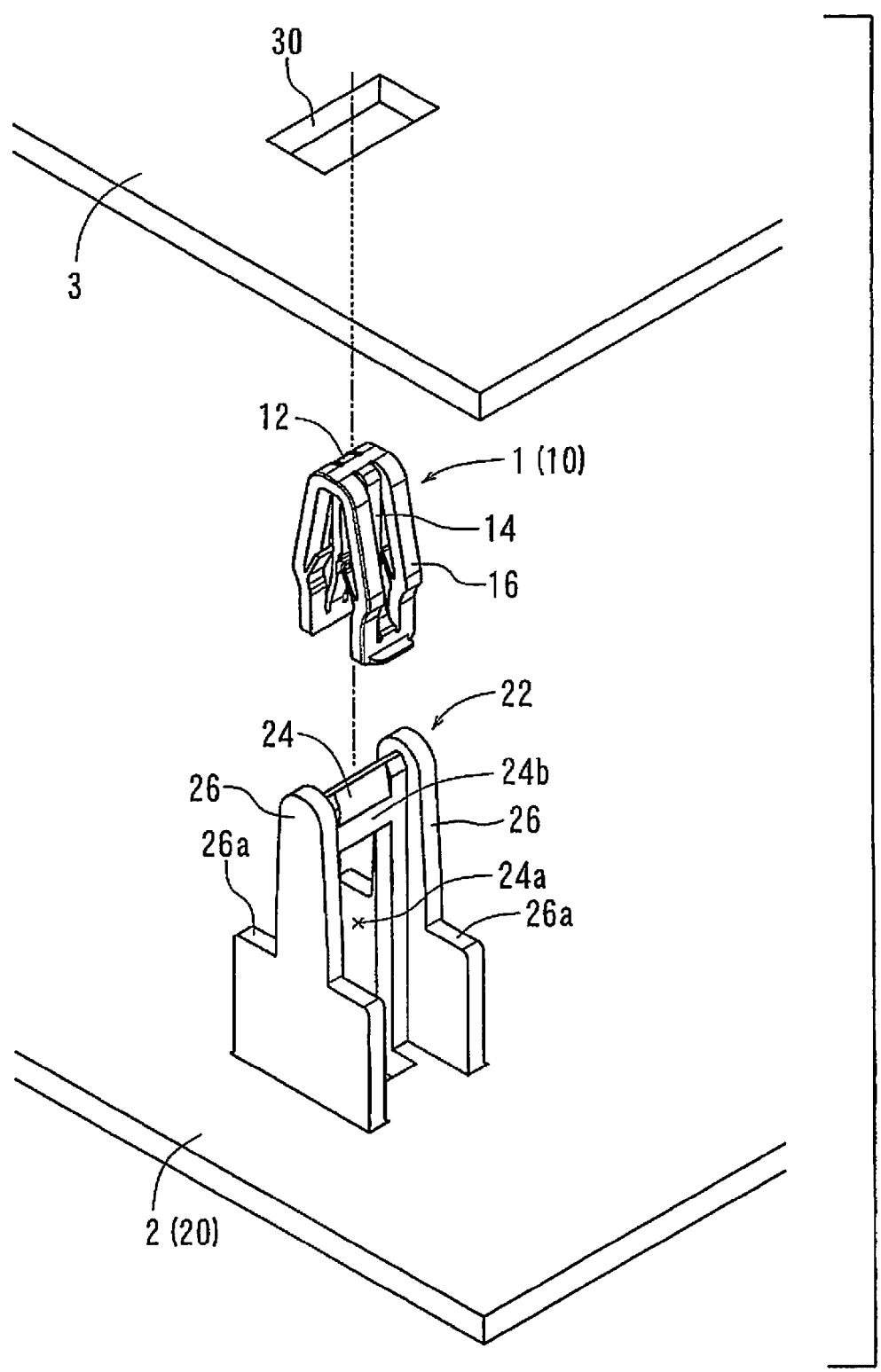
FIG. 1 is a perspective view of a clip according to a first embodiment of the present invention, a center cluster and a instrument panel, which illustrates a condition in which the center cluster is not attached to the instrument panel via the clip.

Detailed representative embodiments of the present invention are shown in FIGS. 1 to 13.

First Embodiment

A first detailed representative embodiment of the present invention will be described with reference to FIGS. 1 to 5. Further, in the following description, "a center cluster 2" of an automobile is exemplified as "an attaching article." Further, "an instrument panel 3" of the automobile is exemplified as "an object panel." The same is true in second and third embodiments.

Hereinafter, a clip 1 and a center cluster 2 of the first embodiment will respectively be described with reference to FIGS. 1 to 3. First, a structure of the clip 1 will be described. The clip 1 may have a substantially U-shaped clip body 10 that is integrally formed by using synthetic resin having rigidity. The clip body 10 may have a curved head portion 12, a clamping portion 14 continuous with the head portion 12, and an engagement portion 16 continuous with the head portion 12. The clamping portion 14 may be composed of a pair of clamping strips 14a. Further, the engagement portion 16 may be composed of a pair of engagement legs 16a.

The head portion 12 may function as a leading end when the clip body 10 is inserted into an attaching hole 30 formed in an instrument panel 3. Therefore, the head portion 12 may preferably have a rounded outer surface.

Figure 2:
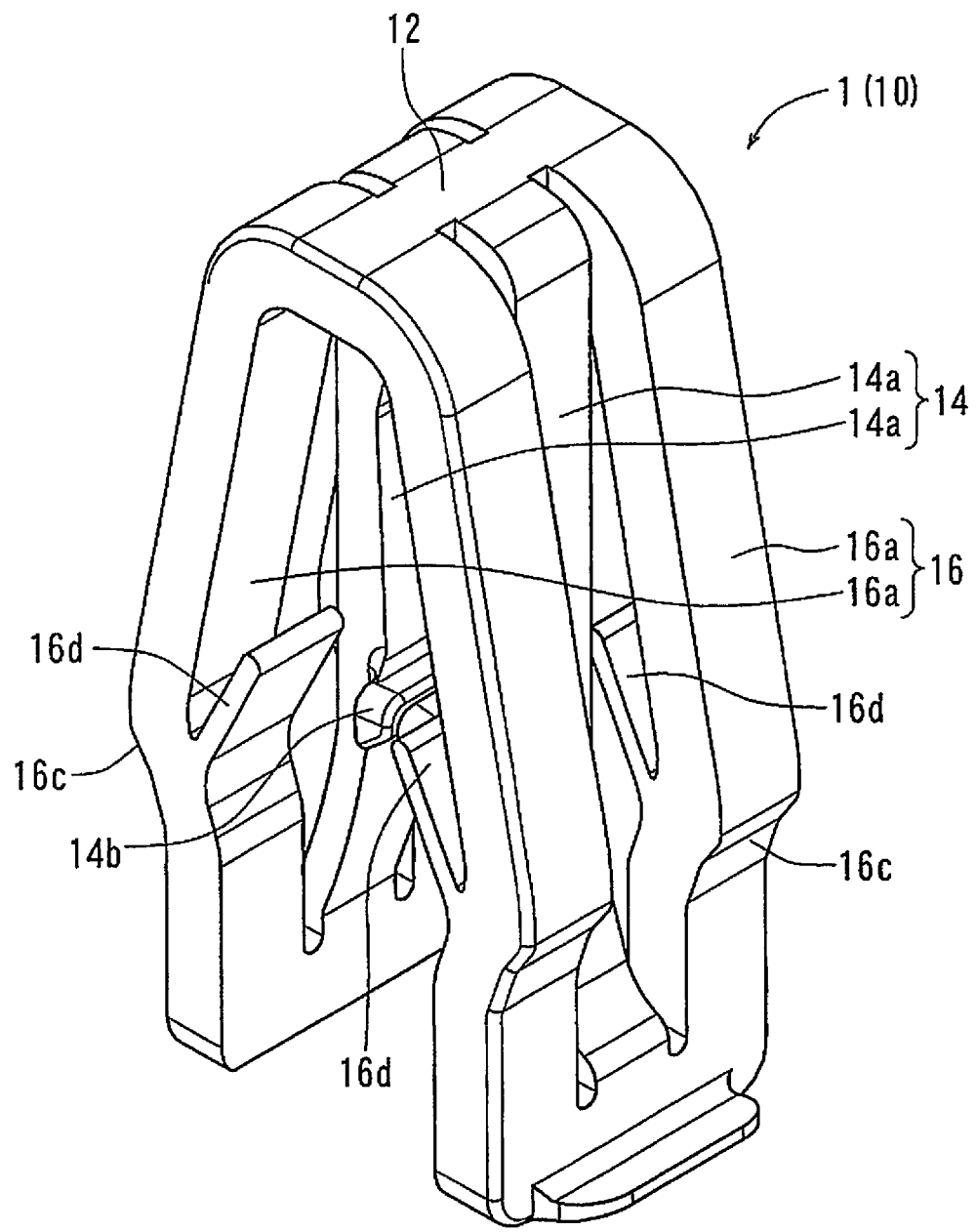
FIG. 2 is an enlarged perspective view of the clip.

As shown in FIG. 2, the clamping strips 14a of the clamping portion 14 may respectively be formed in the engagement legs 16a by partially removing (slotting) the engagement legs 16a. Further, as shown in FIG. 3, the clamping strips 14a may extend inwardly with respect to the engagement legs 16a. In particular, the clamping strips 14a may be positioned opposite to each other at an interval equal to or slightly smaller than the thickness of a rib 24 formed in a center cluster 2.

Figure 4:
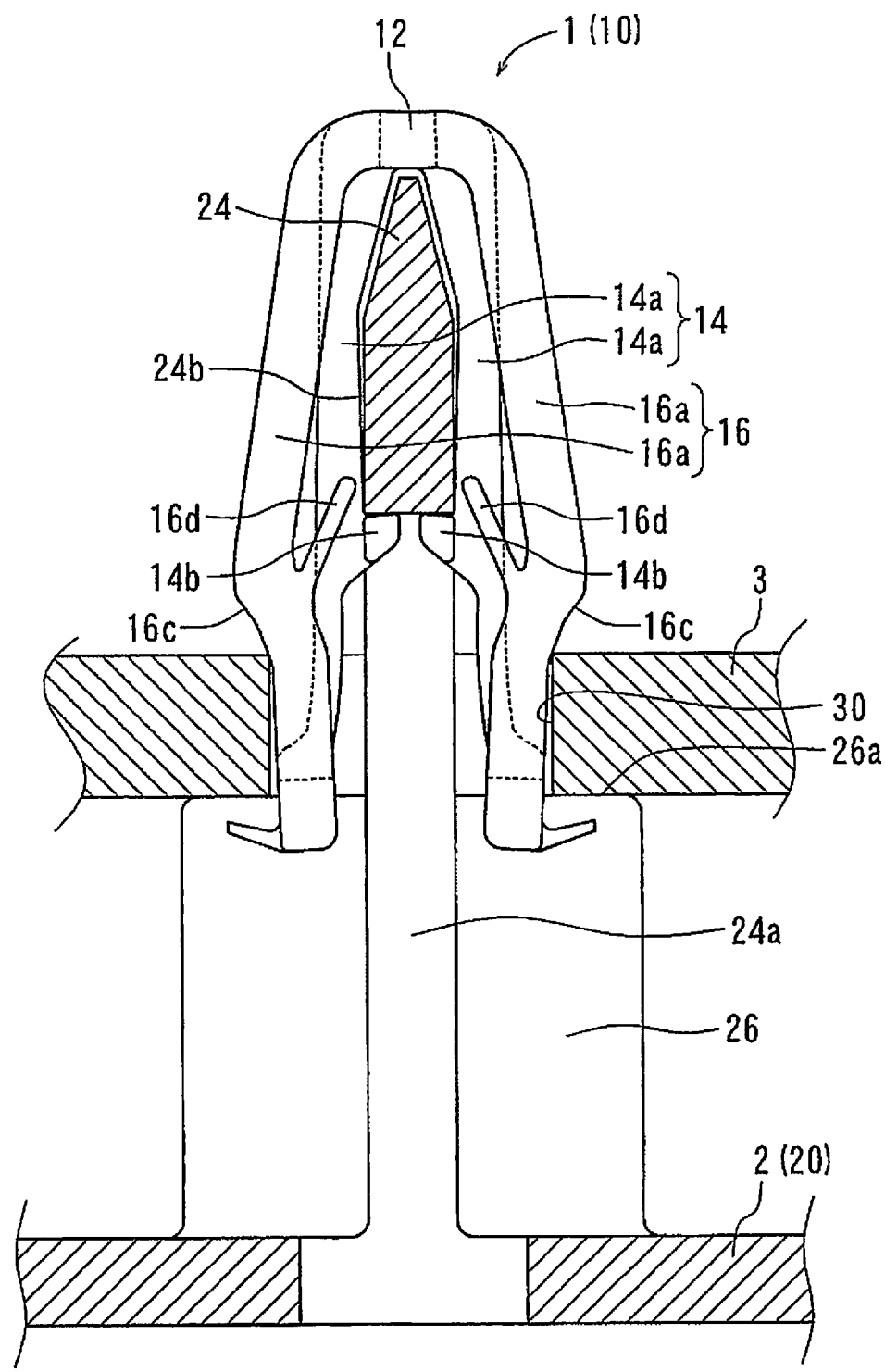
FIG. 4 is a partially sectional elevational view of the clip, the center cluster and the instrument panel, which illustrates a condition in which the center cluster is attached to the instrument panel using the clip.

Further, as shown in FIG. 4, the clamping strips 14a (the clamping portion 14) may be coupled to the rib 24 while the rib 24 is inserted into a space between the clamping strips 14a. Thus, the clip body 10 can be attached to the rib 24. Further, the clamping strips 14a may respectively have a pair of engagement claws 14b formed therein. The engagement claws 14b may be positioned opposite each other. As shown in FIG. 4, the engagement claws 14b may be configured to engage an upper periphery of an engagement slot 24a formed in the rib 24 of the center cluster 2 when the clamping strips 14a can be coupled to the rib 24. Thus, the clamping portion 14 can be securely coupled to the rib 24 due to engagement of engagement claws 14b and the engagement slot 24a. As a result, the clip body 10 can be fixedly attached to the rib 24.

The engagement legs 16a of the engagement portion 16 may be configured to be elastically deformed or flexed inwardly and outwardly with respect to the head portion 12. In particular, the engagement legs 16a may be configured to contact an inner surface of an attaching hole 30 formed in an instrument panel 3 when the clip body 10 is pressed into the attaching hole 30 from the head portion 12, so as to be elastically flexed inwardly. Therefore, when the clip body 10 is pressed into the attaching hole 30, the engagement legs 16a can be elastically flexed in a direction in which a distance therebetween is reduced or narrowed. This allows the clip body 10 to be inserted into the attaching hole 30.

As shown in FIG. 2, the engagement legs 16a may respectively have inclined engagement surfaces 16c that are formed in outer surfaces thereof. The engagement surface 16c of each of the engagement legs 16a may substantially be positioned in a longitudinally middle portion of each of the engagement legs 16a. As shown in FIG. 4, the engagement surfaces 16c may be configured to engage an upper (inner) periphery of the attaching hole 30 of the instrument panel 3 when the clip body 10 is inserted into the attaching hole 30. As shown in FIG. 2, the engagement surface 16c of each of the engagement legs 16a may be laterally divided into two parts by each of the clamping strips 14a of the clamping portion 14. Further, each of the engagement legs 16a may have a pair of cantilevered elastic strips 16d (a biasing body) that are respectively formed in an inner surface thereof so as to extend inwardly and upwardly therefrom. The pair of elastic strips 16d of each of the engagement legs 16a may be positioned adjacent to each other across the clamping strip 14a of each of the engagement legs 16a. As shown in FIG. 3, the pairs of elastic strips 16d of the engagement legs 16a may preferably be positioned opposite each other.

Figure 3:
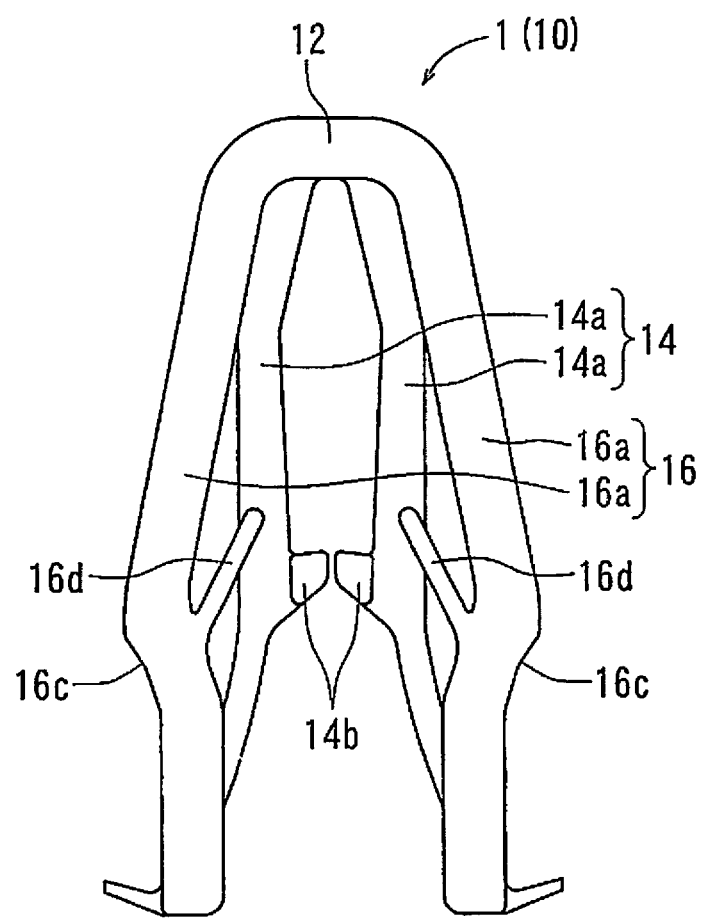
FIG. 3 is an elevational view of the clip.

As shown in FIG. 3, each of the elastic strips 16d may have a wing shape and may be obliquely upwardly projected. Each of the elastic strips 16d may be positioned such that a distal end thereof can elastically contact an outer surface of the rib 24 when the clip body 10 is inserted into the attaching hole 30 of the instrument panel 3 while the engagement portion 16 (the engagement legs 16a) is elastically flexed inwardly. Further, each of the elastic strips 16d may be configured to contact the outer surface of the rib 24 in a portion 24b closer to a distal end of the rib 24 than the engagement slot 24a (i.e., in a portion 24b higher than the engagement slot 24a) when the engagement portion 16 (the engagement legs 16a) is elastically flexed inwardly. Further, as shown in FIG. 4, each of the elastic strips 16d may be positioned such that the distal end thereof can be spaced apart from (not contact) the outer surface of the rib 24 when the clip body 10 is completely inserted into the attaching hole 30. The clip 1 may be constructed described above.

Next, a structure of the center cluster 2 will be described. The center cluster 2 refers to an ornamental panel that is attached to the instrument panel 3 in order to cover the same. The center cluster 2 may be integrally formed using synthetic resin having rigidity. The center cluster 2 may have a center cluster body 20 having outer (ornamental) and inner (non-ornamental) surfaces and a clip attachment base 22 formed in the inner surface of the center cluster body 20.

The clip attachment base 22 may have a rib 24 having an engagement slot 24a formed therein (which is previously described) and a pair of plate-shaped guide members 26 which may function to guide or assist the coupling of the clamping portion 14 (the clamping strips 14a) to the rib 24. As previously described, the engagement slot 24a of the rib 24 may be configured such that the upper periphery thereof can engage the engagement claws 14b of the clamping strips 14a when the clamping strips 14a are coupled to the rib 24. Further, as shown in FIG. 1, the engagement slot 24a of the rib 24 may preferably extend to a proximal end of the rib 24 and penetrate the center cluster body 20. That is, the engagement slot 24a of the rib 24 may be formed as an elongated open ended slot that opens the outer surface of the center cluster body 20.

Figure 5:
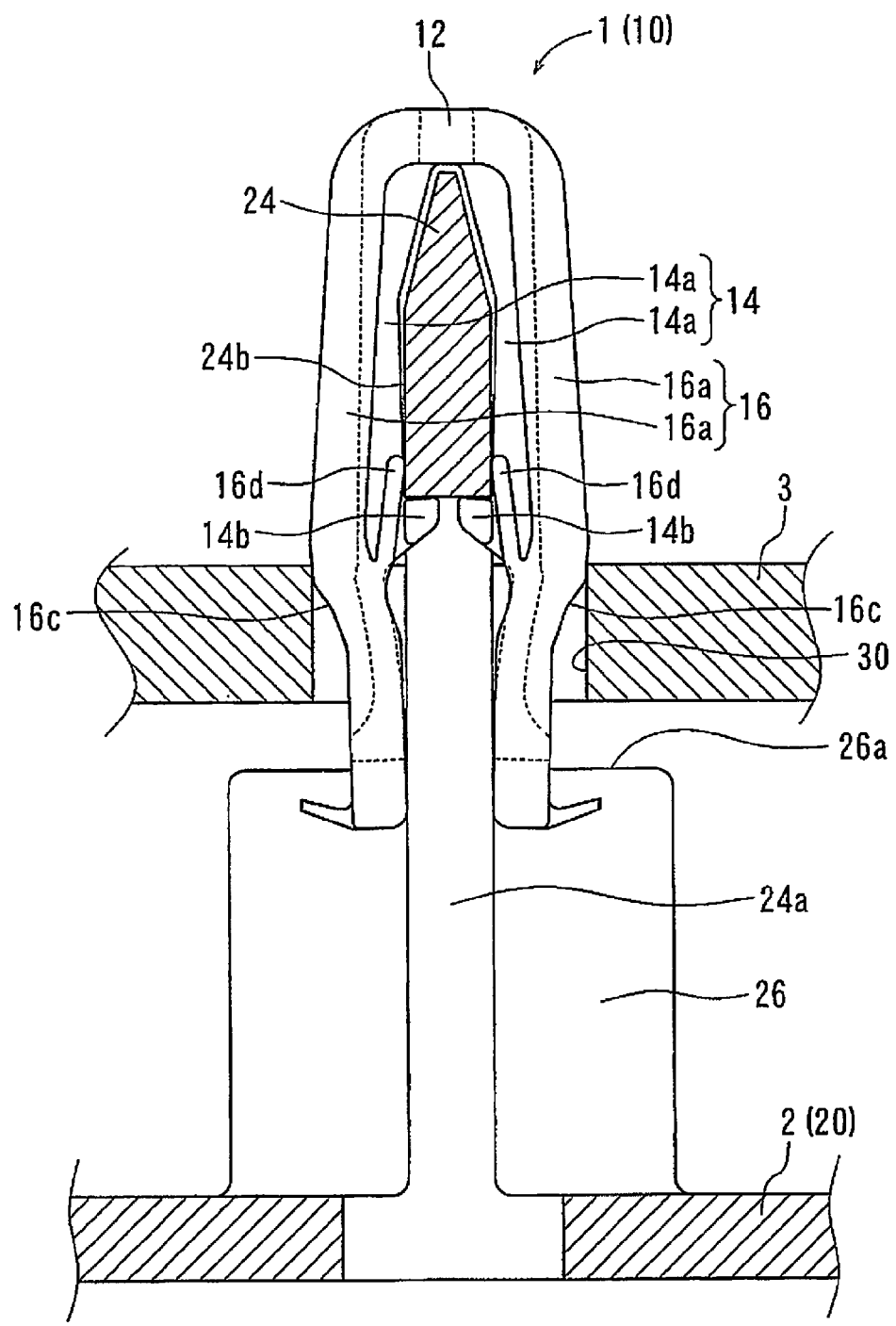
FIG. 5 is a view similar to FIG. 4, which illustrates a condition in which an extraction load is applied to the clip.

As shown in FIGS. 1, 4 and 5, the rib 24 may have a wedge-shaped distal end, so as to be easily or smoothly introduced into the space between the clamping strips 14a of the clip body 10. Further, the guide members 26 may respectively be attached to opposite sides of the rib 24 so as to laterally support the same. Each of the guide members 26 may have widened proximal end portions having a pair of shoulder surfaces 26a.

Next, a method of attaching the center cluster 2 to the instrument panel 3 using the clip 1 will now be described in detail. First, the rib 24 of the clip attachment base 22 of the center cluster 2 is introduced into the space between the pair of clamping strips 14a of the clip body 10. As a result, the rib 24 can be clamped from both sides by the pair of clamping strips 14a. At the same time, the engagement claws 14b can engage the upper periphery of the engagement slot 24a formed in the rib 24. Thus, the clip body 10 can be attached to the rib 24 of the center cluster 2.

Thereafter, the clip body 10 attached to the rib 24 of the center cluster 2 may be pushed into the attaching hole 30 formed in the instrument panel 3 from the head portion 12 of the clip body 10. As a result, the clip body 10 can be introduced into the attaching hole 30 while the pairs of engagement legs 16a are elastically flexed (inwardly) in the direction in which the distance therebetween is reduced or narrowed. At this time, each of the elastic strips 16d can elastically contact the outer surface of the rib 24. As shown in FIG. 4, when the clip body 10 is completely inserted into the attaching hole 30 until the shoulder surfaces 26a of the clip attachment base 22 contacts an outer surface of the instrument panel 3, the engagement surfaces 16c of the pair of engagement legs 16a pass through the attaching hole 30. As a result, the engagement legs 16a can be slightly restored or flexed outwardly, so that the engagement surfaces 16c can engage the upper (inner) periphery of the attaching hole 30 in an inner surface of the instrument panel 3. At the same time, the elastic strips 16d formed in the engagement legs 16a can be spaced from (not contact) the outer surface of the rib 24.

At this time, because the pair of engagement legs 16a may substantially be elastically flexed inwardly by the upper periphery of the attaching hole 30 (FIG. 4), the engagement surfaces 16c of the pair of engagement legs 16a can be pressed against the upper periphery of the attaching hole 30 formed in the instrument panel 3 due to elastic biasing forces of the engagement legs 16a. Further, the elastic biasing forces of the engagement legs 16a may correspond to engaging forces of the engagement legs 16a to the instrument panel 3 (the attaching hole 30) (i.e., forces causing the engagement legs 16a to engage the instrument panel 3). As a result, the engagement legs 16a can be securely held in the attaching hole 30, so that the clip body 10 can be attached to the instrument panel 3. Thus, the center cluster 2 can be attached to the instrument panel 3 via the clip 1.

As described above, the clip body 10 can be attached to the instrument panel 3 by the elastic biasing force of the engagement legs 16a. In other words, a connecting force of the clip body 10 to the instrument panel 3 (i.e., a force connecting the clip body 10 to the instrument panel 3) can be produced by the elastic biasing force of the engagement legs 16a. As a result, an attached condition of the clip body 10 in which the clip body 10 is attached to the instrument panel 3 can be maintained. Therefore, even when an extraction load is applied to the clip body 10, the clip body 10 can be effectively prevented from being detached from the instrument panel 3.

Next, performance of the clip 1 after a prolonged attached condition of the clip body 10 will be described. Generally, when the attached condition of the clip body 10 is maintained for a long period of time, the pair of engagement legs 16a can be subjected to a heat creep phenomenon. This may occur because the pair of engagement legs 16a may be continuously elastically flexed inwardly during the attached condition of the clip body 10. As a result, elasticity of the pair of engagement legs 16a can be reduced. This means that the elastic biasing forces of the engagement legs 16a can be reduced.

Conversely, as described above, in the attached condition of the clip body 10, the elastic strips 16d formed in the engagement legs 16a may not contact the rib 24 (FIG. 4). That is, in the attached condition of the clip body 10, the elastic strips 16d may not be elastically flexed or stressed. Therefore, even if the attached condition of the clip body 10 is maintained for a long period of time, the elastic strips 16d cannot be subjected to the heat creep phenomenon. As a result, elasticity of the elastic strips 16d cannot be reduced even after the prolonged attached condition of the clip body 10.

When the extraction load is applied to the clip body 10 after the prolonged attached condition of the clip body 10 (i.e., after the heat creep phenomenon occurs in the engagement legs 16a), the pair of engagement legs 16a can be easily deformed or contracted inwardly because the elasticity thereof is reduced. However, as shown in FIG. 5, at this time, the elastic strips 16d can elastically contact the outer surface of the rib 24 in the portion 24b closer to the distal end of the rib 24 than the engagement slot 24a (i.e., in the portion 24b higher than the engagement slot 24a). Therefore, elastic biasing forces of the elastic strips 16d can act on the outer surface of the rib 24, so that reactive forces of the elastic biasing forces of the elastic strips 16d can act on the engagement legs 16a from the rib 24. The reactive forces of the elastic biasing forces of the elastic strips 16d can function to prevent the engagement legs 16a from being deformed inwardly. That is, the reactive forces of the elastic biasing forces of the elastic strips 16d can function as new or additional engaging forces of the engagement legs 16a to the instrument panel 3 (i.e., additional forces for causing the engagement legs 16a to engage the instrument panel 3). As a result, the connecting force of the clip body 10 to the instrument panel 3 can be effectively prevented from being reduced. Thus, the attached condition of the clip body 10 to the instrument panel 3 can be reliably maintained.

Thus, according to the clip 1 of the present embodiment, even when the elasticity of the engagement legs 16a are reduced or lost due to the heat creep phenomenon, the reactive forces of the elastic biasing forces of the elastic strips 16d can function as the new or additional engaging forces of the engagement legs 16a to the instrument panel 3. Therefore, even when the extraction load is applied to the clip body 10 after the prolonged attached condition of the clip body 10, the clip body 10 can be effectively prevented from being removed from the instrument panel 3 (the attaching hole 30).

Further, according to the clip 1, the elastic strips 16d are configured to elastically contact the outer surface of the rib 24 in a portion higher than the engagement slot 24a formed in the rib 24 when the engagement legs 16a are deformed or contracted inwardly. Therefore, the engagement slot 24a of the rib 24 can be formed as the elongated open ended slot that extends to the proximal end of the rib 24 and penetrates the center cluster body 20. Therefore, when the center cluster 2 having the rib 24 is formed by injection molding, it is not necessary to incorporate a slide die into an injection molding die in order to form the engagement slot 24a in the rib 24. That is, the engagement slot 24a of the rib 24 can be formed without using the slide die.

Second Embodiment

Figure 6:
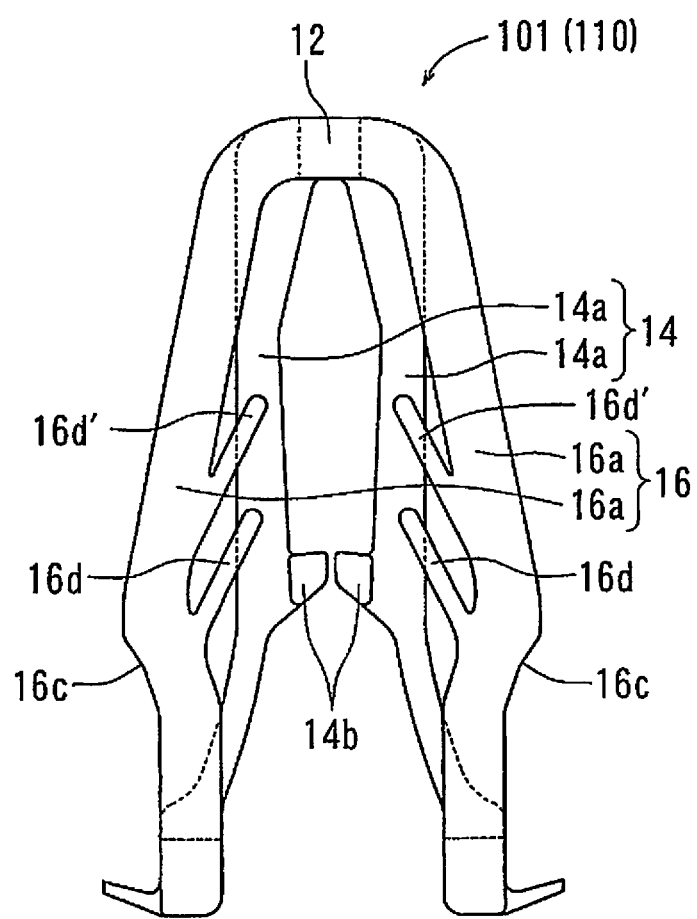
FIG. 6 is an elevational view of a clip according to a second embodiment of the present invention.
Figure 7:
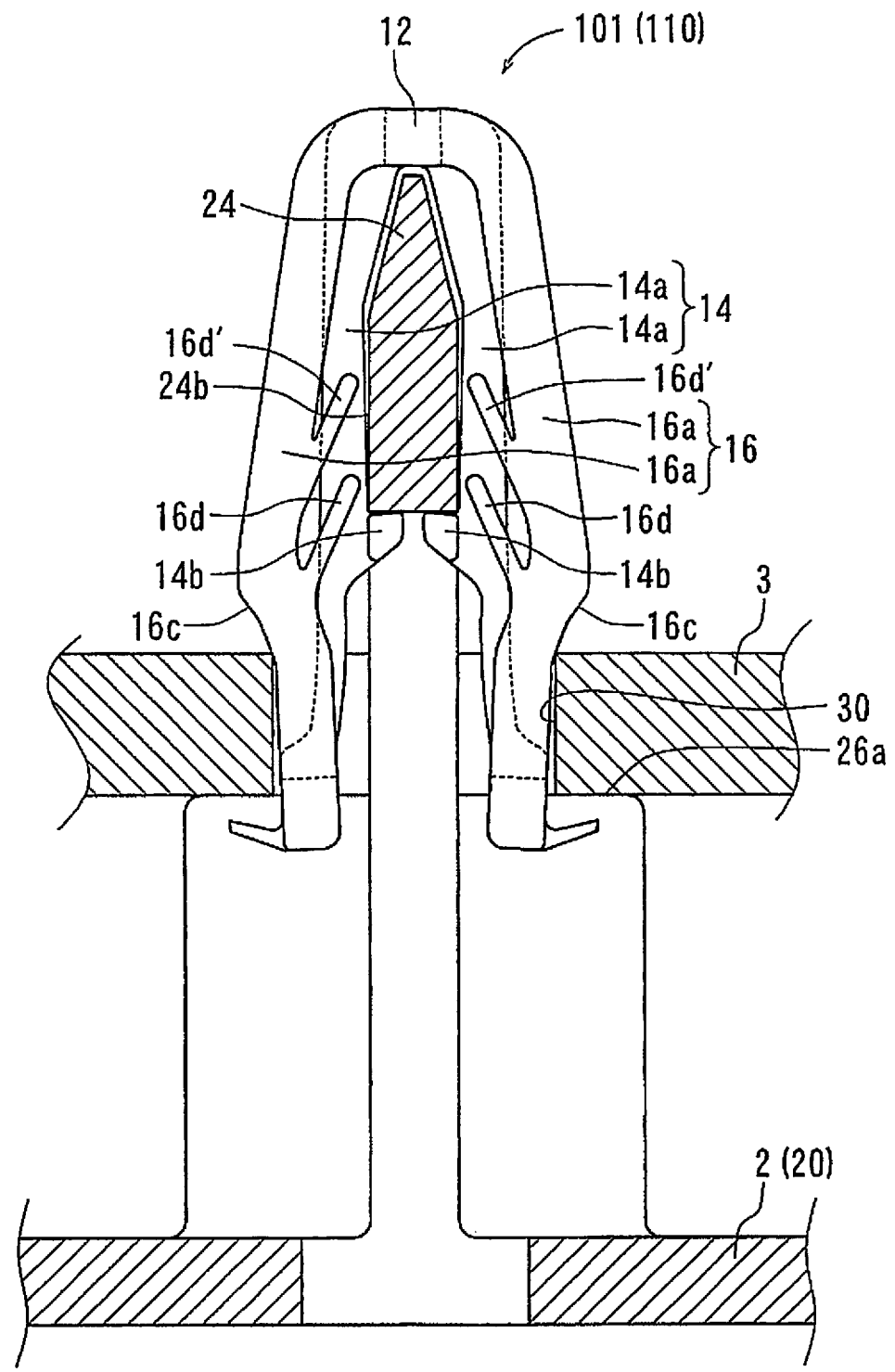
FIG. 7 is a partially sectional elevational view of the clip, a center cluster and an instrument panel, which illustrates a condition in which the center cluster is attached to the instrument panel via the clip.
Figure 8:
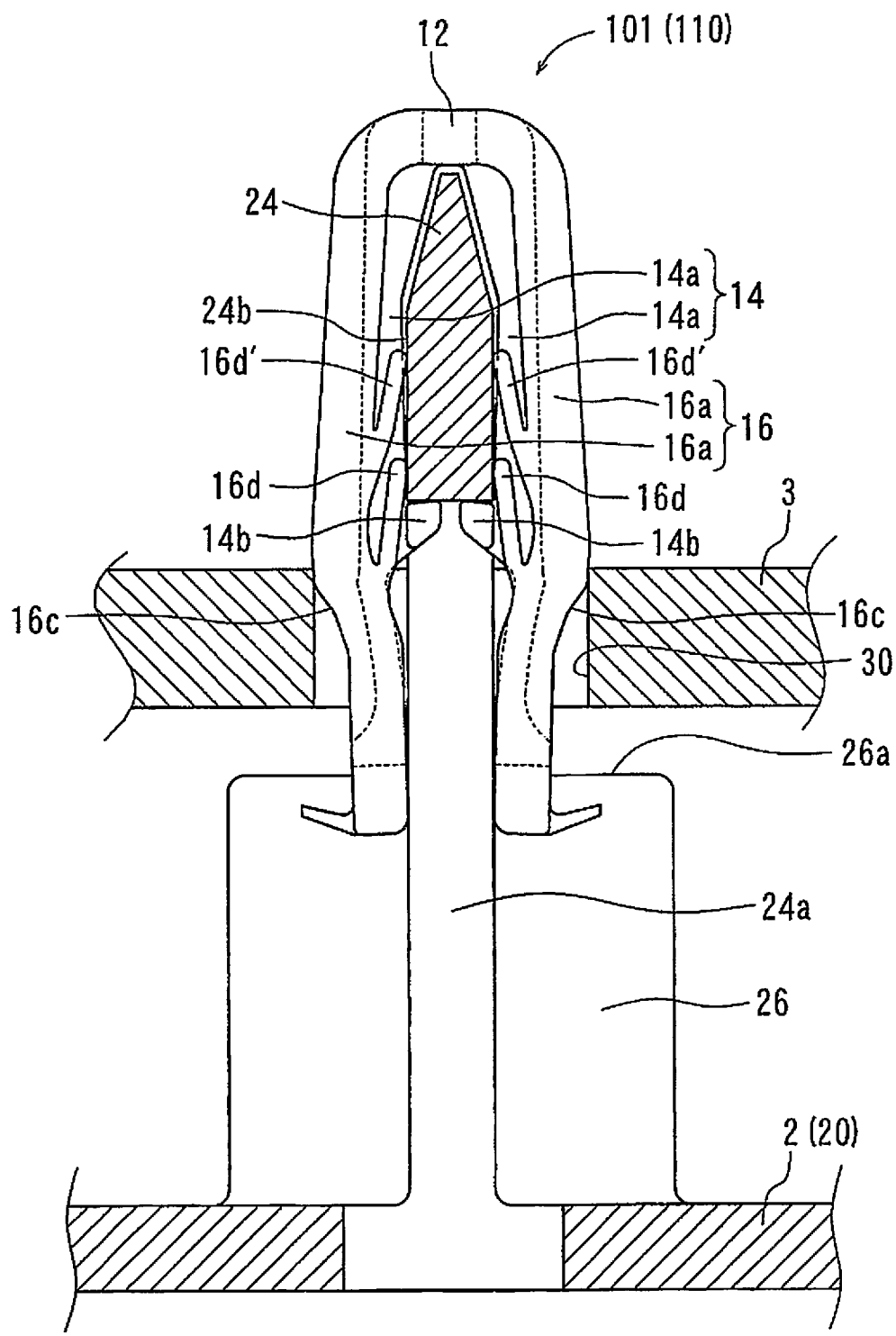
FIG. 8 is a view similar to FIG. 7, which illustrates a condition in which an extraction load is applied to the clip.

The second detailed representative embodiment will now be described in detail with reference to FIGS. 6 to 8. Because the second embodiment relates to the first embodiment, only the constructions and elements that are different from the first embodiment will be explained in detail.

In this embodiment, a clip 101 may have a clip body 110. Similar to the clip body 10 of the first embodiment, the clip body 110 may have the engagement portion 16 that is composed of the pair of engagement legs 16a. Further, each of the engagement legs 16a may have a pair of elastic strips 16d. However, unlike the first embodiment, each of the engagement legs 16a may have an additional pair of elastic strips 16d' (a biasing body) that are formed in the inner surface thereof and having the same shape as the engagement legs 16a. As shown in FIGS. 6-8, the additional pair of elastic strips 16d' may preferably be positioned above the pair of elastic strips 16d. Further, similar to the pair of elastic strips 16d, the additional pair of elastic strips 16d' may be positioned adjacent to each other and across from the clamping strip 14a of each of the engagement legs 16a. Further, the additional pairs of elastic strips 16d' of the engagement legs 16a may preferably be positioned opposite each other.

The center cluster 2 can be attached to the instrument panel 3 using the clip 101 in the same manner as the first embodiment. According to the clip 101, as shown in FIG. 8, when the extraction load is applied to the clip body 110 after the heat creep phenomenon occurs in the engagement legs 16a, the elastic strips 16d and the additional elastic strips 16d' can elastically contact the outer surface of the rib 24.

Therefore, elastic biasing forces of the additional elastic strips 16*d'* can act on the outer surface of the rib 24 in addition to the elastic biasing forces of the elastic strips 16*d*. In this way, reactive forces of the elastic biasing forces of the additional elastic strips 16*d'* can act on the engagement legs 16*a* in addition to the reactive forces of the elastic biasing forces of the elastic strips 16*d*. The reactive forces of the elastic biasing forces of the elastic strips 16*d* and the additional elastic strips 16*d'* can simultaneously function as new engaging forces of the engagement legs 16*a* to the instrument panel 3 (i.e., new forces for causing the engagement legs 16*a* to engage the instrument panel 3. That is, the engaging forces of the engagement legs 16*a* to the instrument panel 3 can be increased by the elastic biasing forces of the additional elastic strips 16*d'*. As a result, the connecting force of the clip body 110 to the instrument panel 3 can be increased. Thus, the attached condition of the clip body 110 to the instrument panel 3 can be further securely maintained.

Third Embodiment

The third detailed representative embodiment will now be described in detail with reference to FIGS. 9-11. Because the third embodiment relates to the first embodiment, only the constructions and elements that are different from the first embodiment will be explained in detail.

Figure 9:
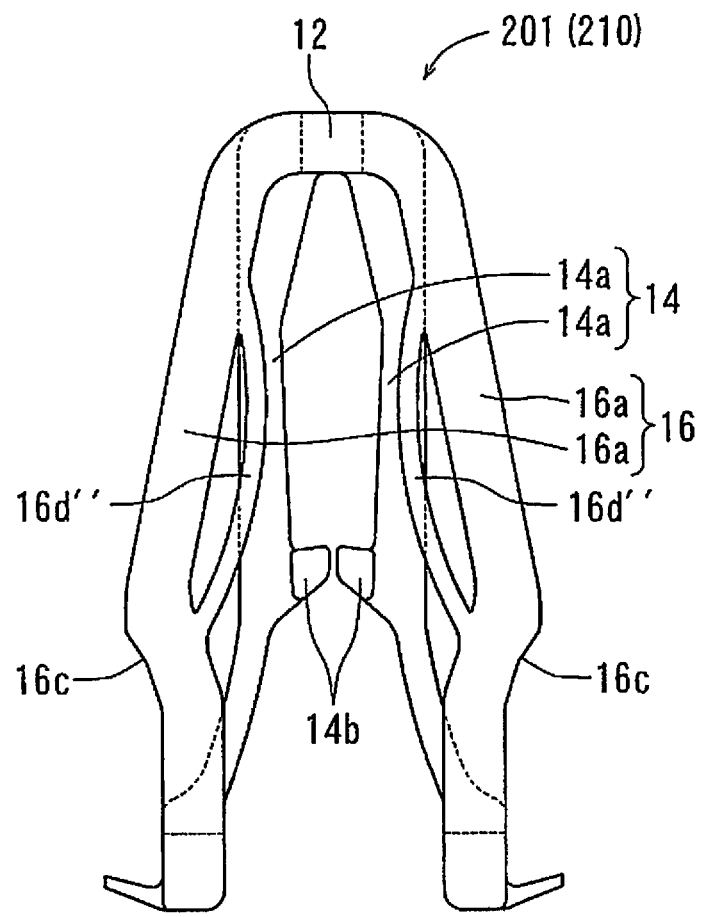
FIG. 9 is an elevational view of a clip according to a third embodiment of the present invention.
Figure 10:
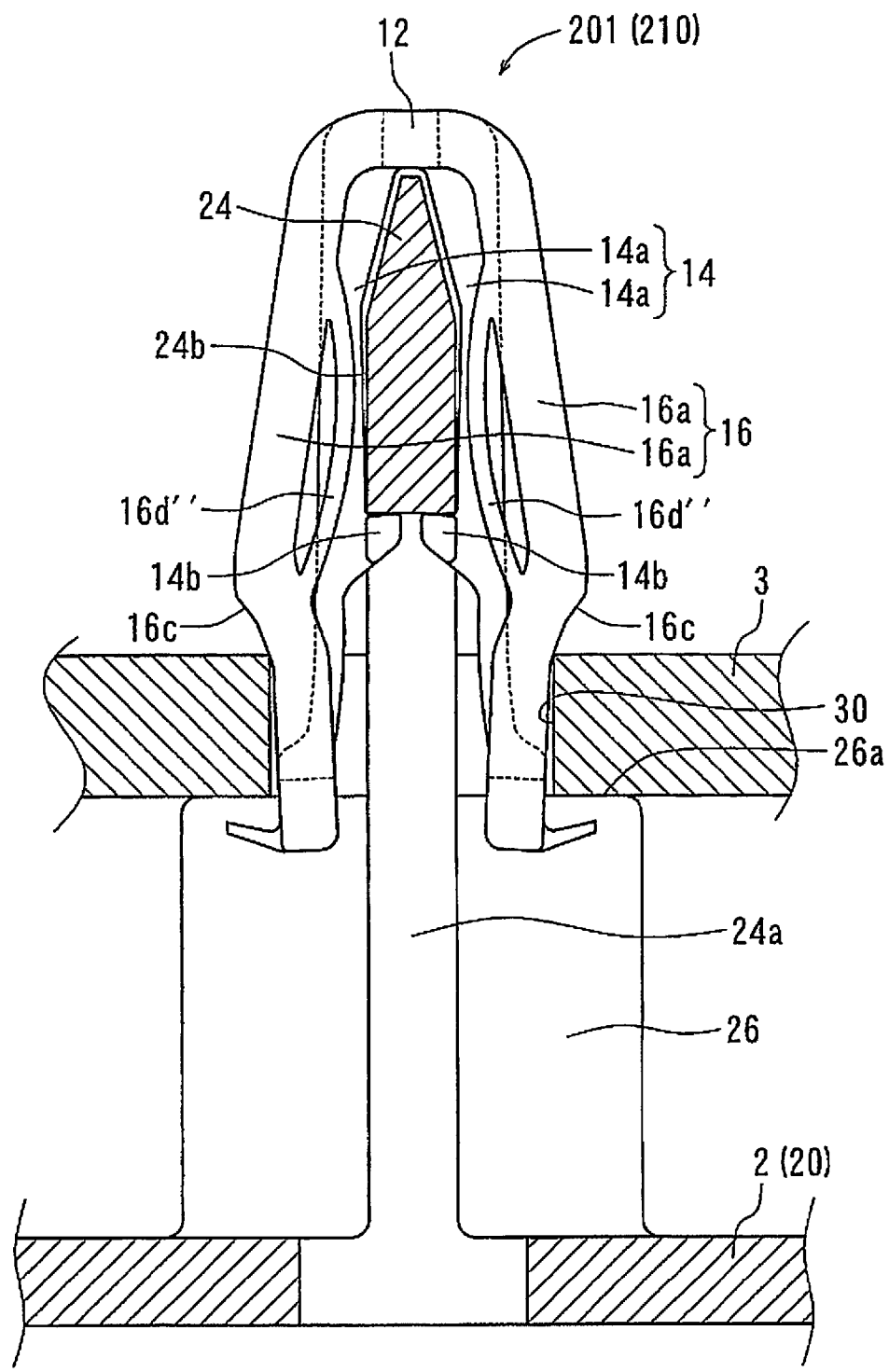
FIG. 10 is a partially sectional elevational view of the clip, a center cluster and an instrument panel, which illustrates a condition in which the center cluster is attached to the instrument panel via the clip.
Figure 11:
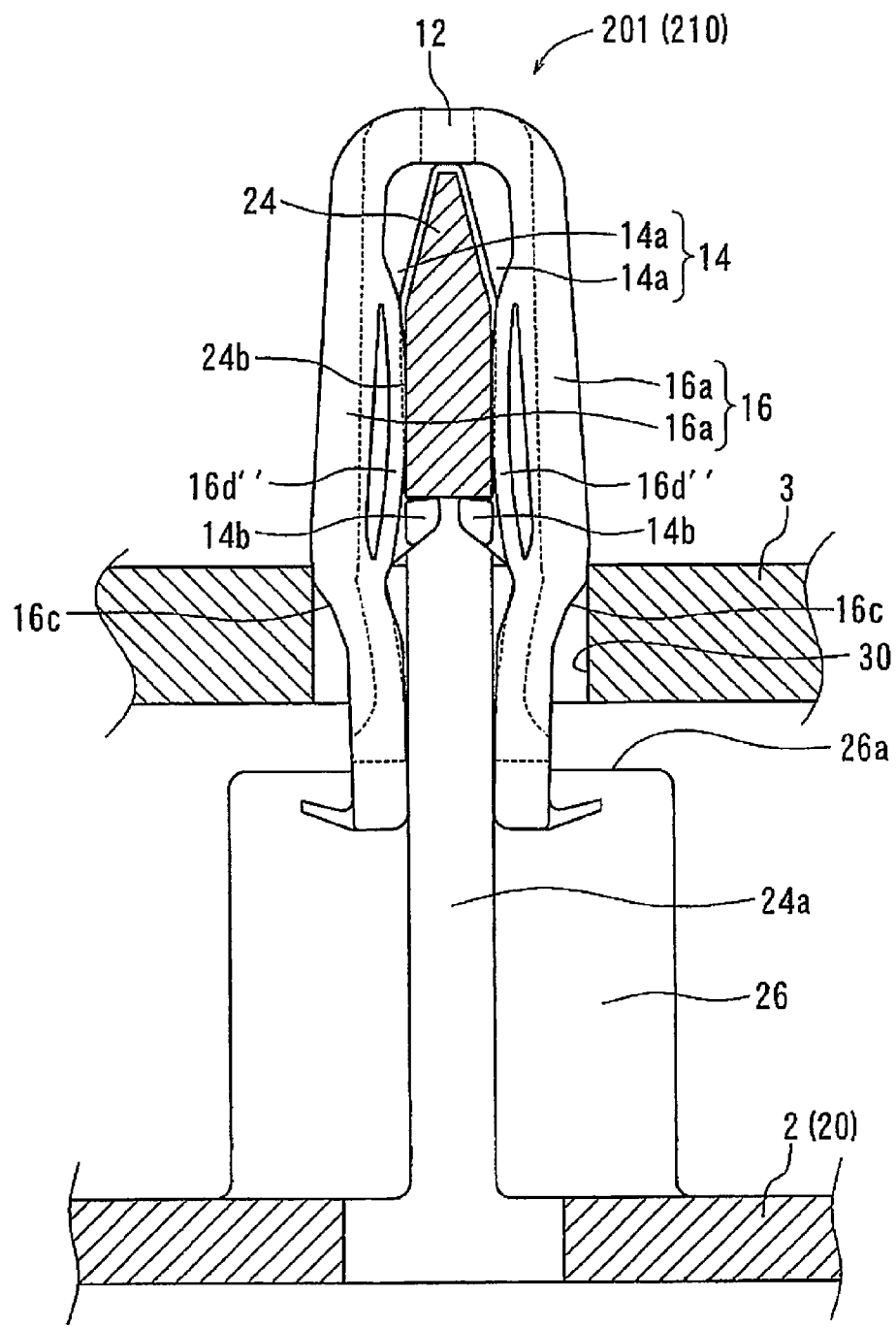
FIG. 11 is a view similar to FIG. 10, which illustrates a condition in which an extraction load is applied to the clip.

In this embodiment, as shown in FIGS. 9-11, a clip 201 may have a clip body 210. Similar to the clip body 10 of the first embodiment, the clip body 210 may have an engagement portion 16 that is composed of the pair of engagement legs 16*a*. However, in this embodiment, each of the engagement legs 16*a* may have a pair of arcuate elastic strips 16*d"* (a biasing body) instead of the pair of elastic strips 16*d*. Unlike the pair of elastic strips 16*a*, the pair of elastic strips 16*d"* may respectively be formed as both-end supported strips. The pairs of elastic strips 16*d"* of the engagement legs 16*a* may respectively be positioned opposite each other and bulging toward each other.

Each of the elastic strips 16*d"* may preferably be positioned such that a substantially central portion thereof can elastically contact an outer surface of the rib 24 when the clip body 210 is inserted into the attaching hole 30 of the instrument panel 3 while the engagement portion 16 (the engagement legs 16*a*) is elastically flexed inwardly. Further, similar to the elastic strips 16*d* of the first embodiment, each of the elastic strips 16*d"* may be configured such that the central portion thereof can contact the outer surface of the rib 24 in the portion 24*b* closer to the distal end of the rib 24 than the engagement slot 24*a* (i.e., in the portion 24*b* higher than the engagement slot 24*a*) when the engagement portion 16 (the engagement legs 16*a*) is elastically flexed inwardly. Further, as shown in FIG. 10, similar to the elastic strips 16*d* of the first embodiment, the elastic strips 16*d"* formed in the engagement legs 16*a* may be positioned such that the central portion thereof can be spaced from the rib 24 when the clip body 210 is completely inserted into the attaching hole 30 (when the engagement surfaces 16*c* engage the upper periphery of the attaching hole 30).

According to the clip 201, the elastic strips 16*d"* formed in the engagement legs 16*a* may not contact the rib 24 in the attached condition of the clip body 210 to the instrument panel 3 (FIG. 10). That is, in the attached condition of the clip body 210, the elastic strips 16*d"* may not be elastically flexed or stressed. Therefore, even if the attached condition of the clip body 210 is maintained for a long period of time, the elastic strips 16*d"* cannot be subjected to the heat creep phenomenon. As a result, similar to the elastic strips 16*d* of the first embodiment, elasticity of the elastic strips 16*d"* cannot be reduced even after the prolonged attached condition of the clip body 210.

As shown in FIG. 11, according to the clip 201 thus formed, when the extraction load is applied to the clip body 210 after the prolonged attached condition of the clip body 210, the elastic strips 16*d"* may have the same function as the elastic strips 16*d* of the first embodiment. Thus, the attached condition of the clip body 10 to the instrument panel 3 can be securely maintained. Further, the elastic strips 16*d"* may have elastic biasing forces greater than the elastic biasing forces of the elastic strips 16*d* of the first embodiment. As a result, greater elastic biasing forces can act on the outer surface of the rib 24 in the portion 24*b* closer to the distal end of the rib 24 than the engagement slot 24*a*, so that greater reactive forces of the elastic biasing forces of the elastic strips 16*d"* can act on the engagement legs 16*a* from the rib 24. Therefore, the connecting force of the clip body 10 to the instrument panel 3 can be further effectively prevented from being reduced. Thus, the attached condition of the clip body 10 to the instrument panel 3 can be further securely maintained.

First Modified Form

Figure 12:
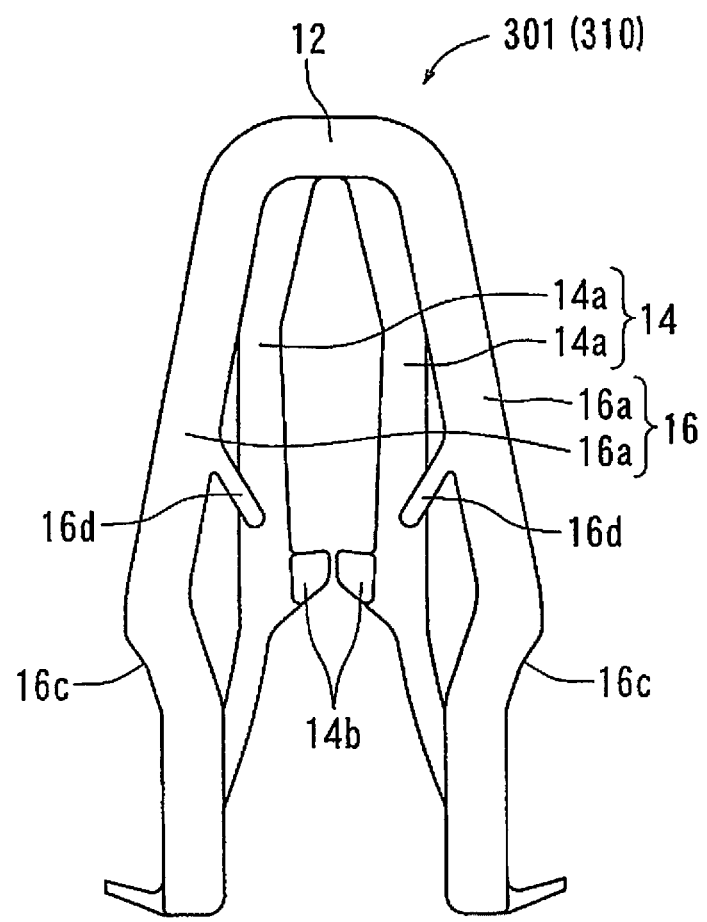
FIG. 12 is an elevational view of a clip according to a modified form of the first embodiment of the present invention.

The clip 1 of the first embodiment can be modified. That is, as shown in FIG. 12, the clip 1 can be changed to a clip 301 having a clip body 310. In the first modified form, the elastic strips 16*d* are formed in the inner surface of each of the engagement legs 16*a* so as to project downwardly therefrom.

Second Modified Form

Figure 13:
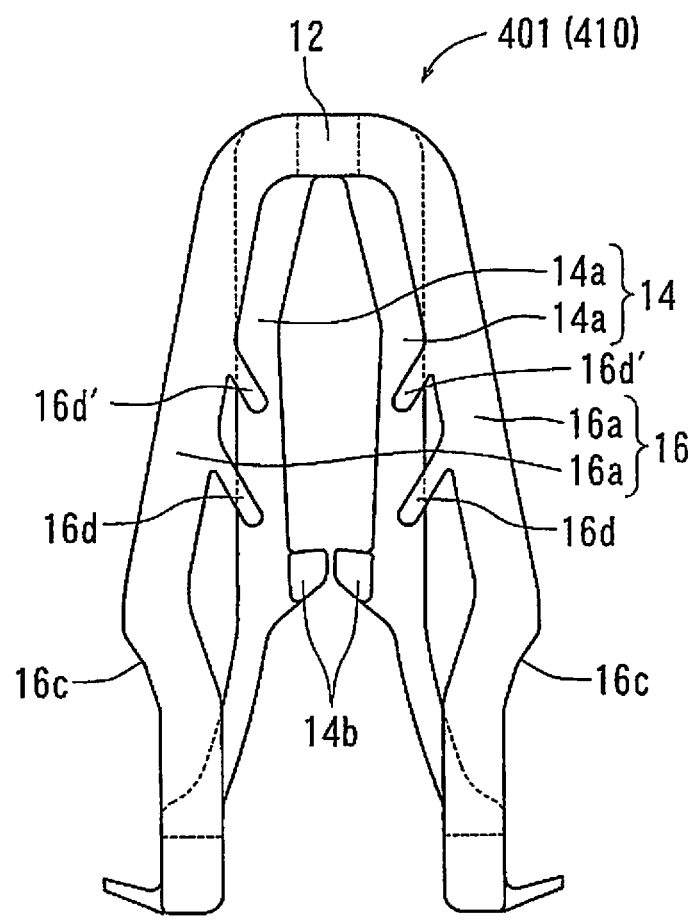
FIG. 13 is an elevational view of a clip according to a modified form of the second embodiment of the present invention.
Figure 14:
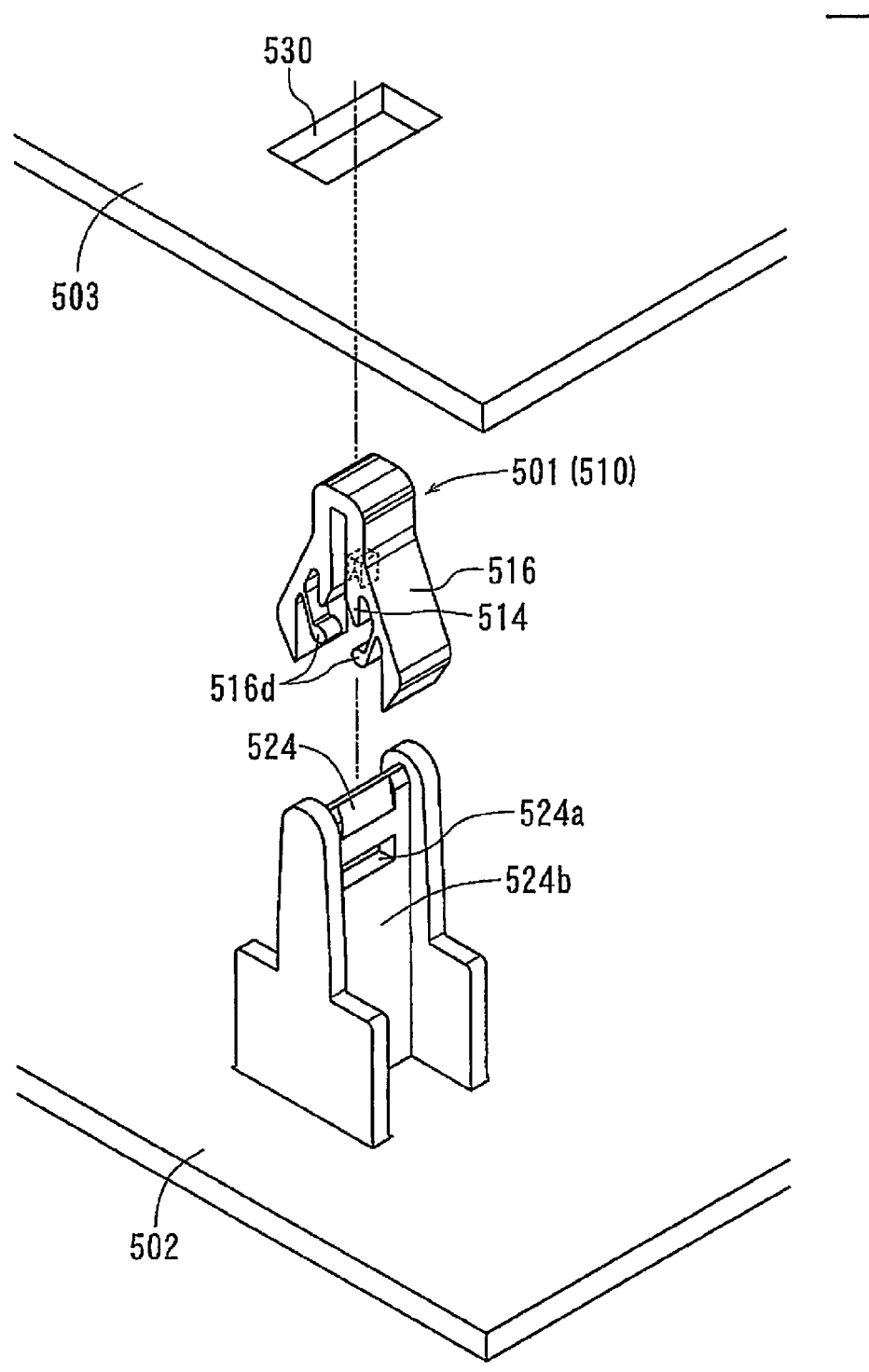
FIG. 14 is a perspective view of a conventional clip, a center cluster and a instrument panel, which illustrates a condition in which the center cluster is not attached to the instrument panel via the clip.
Figure 15:
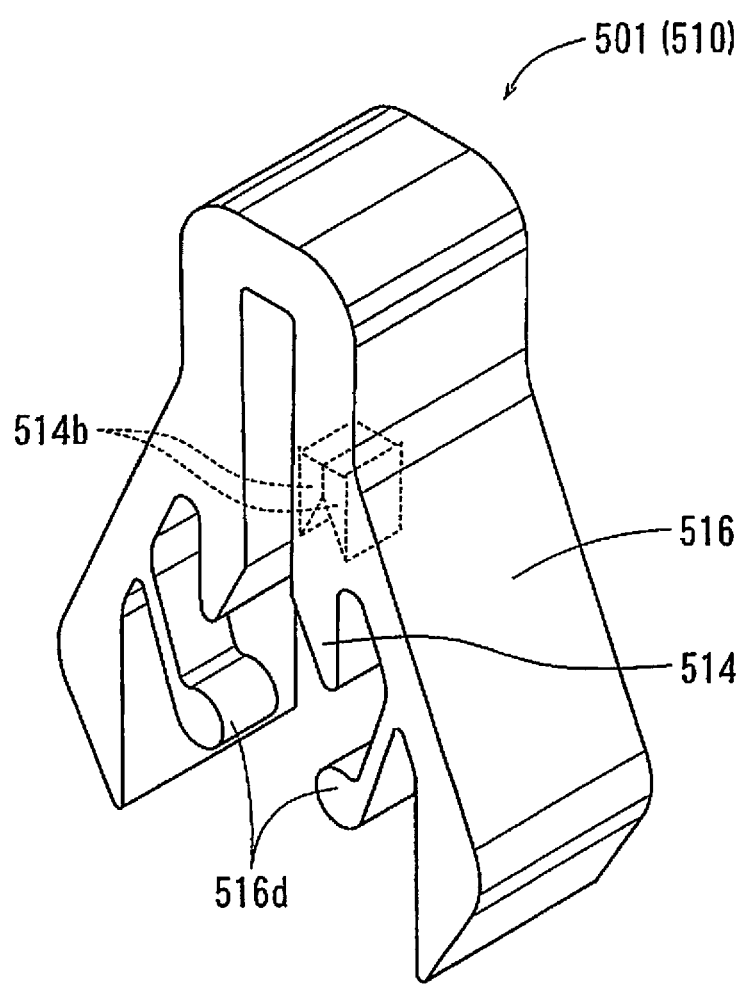
FIG. 15 is an enlarged perspective view of the clip.
Figure 16:
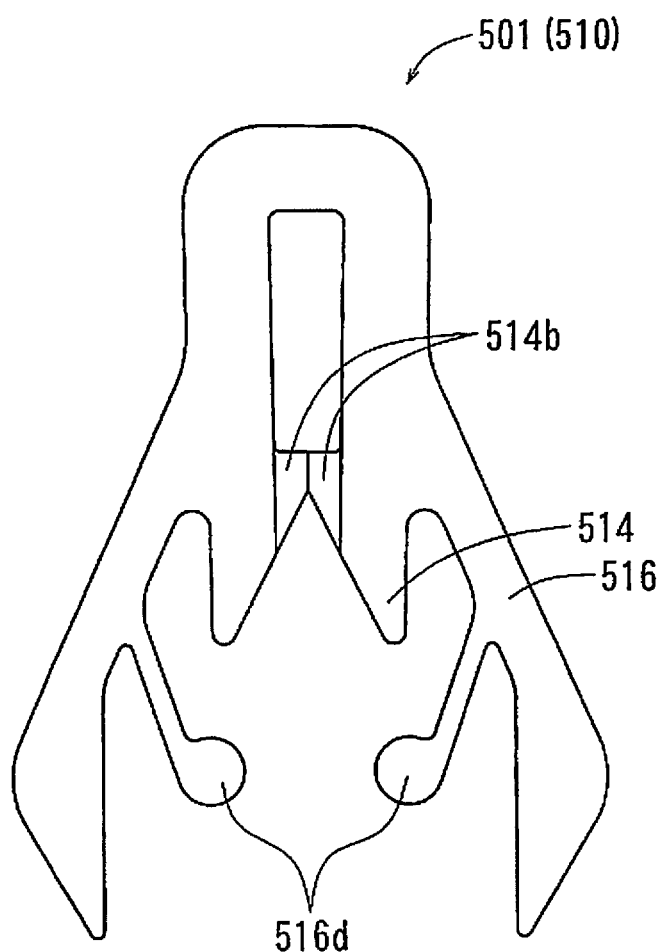
FIG. 16 is an elevational view of the clip.
Figure 17:
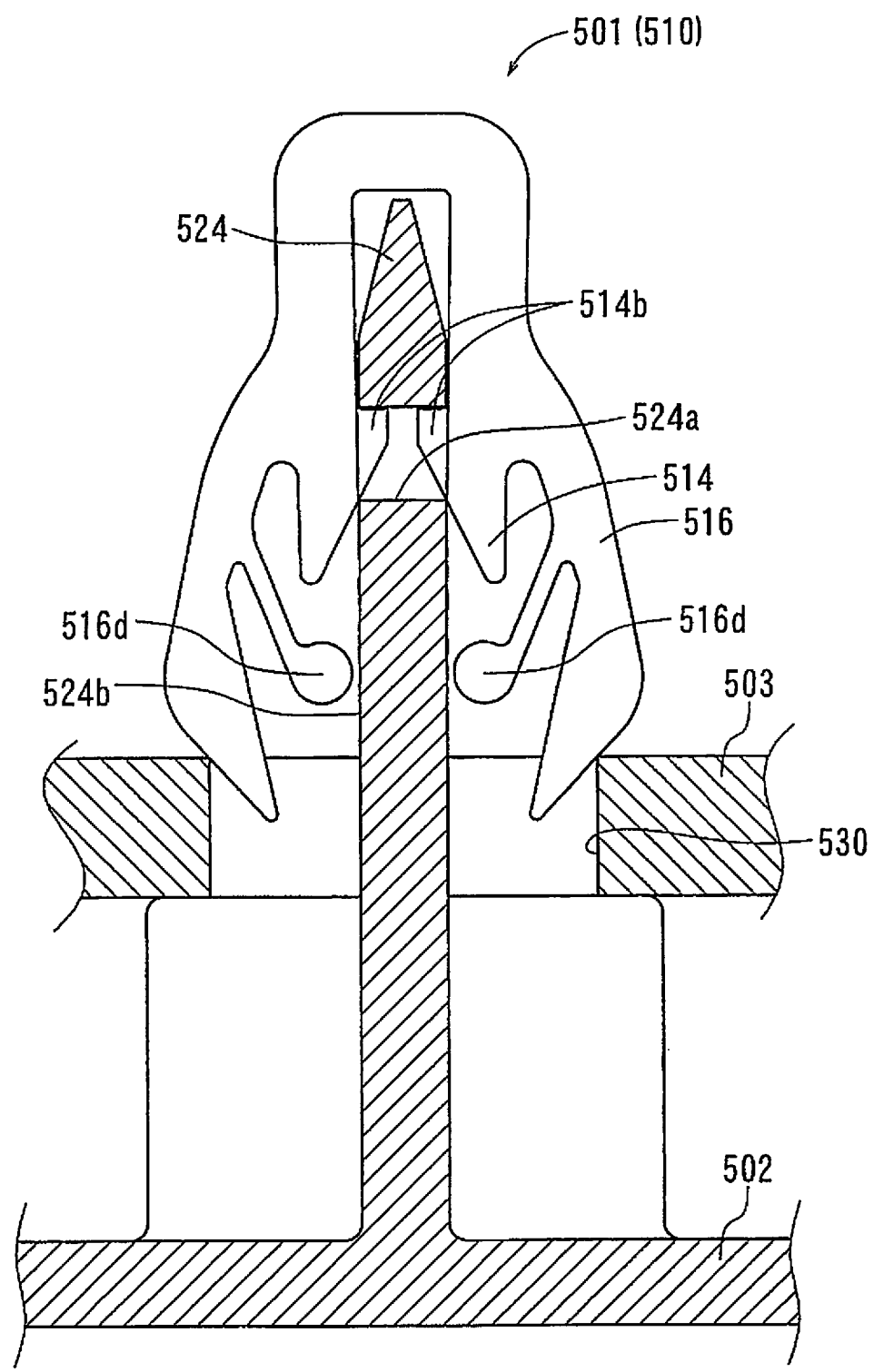
FIG. 17 is a partially sectional elevational view of the clip, the center cluster and the instrument panel, which illustrates a condition in which the center cluster is attached to the instrument panel via the clip.
Figure 18:
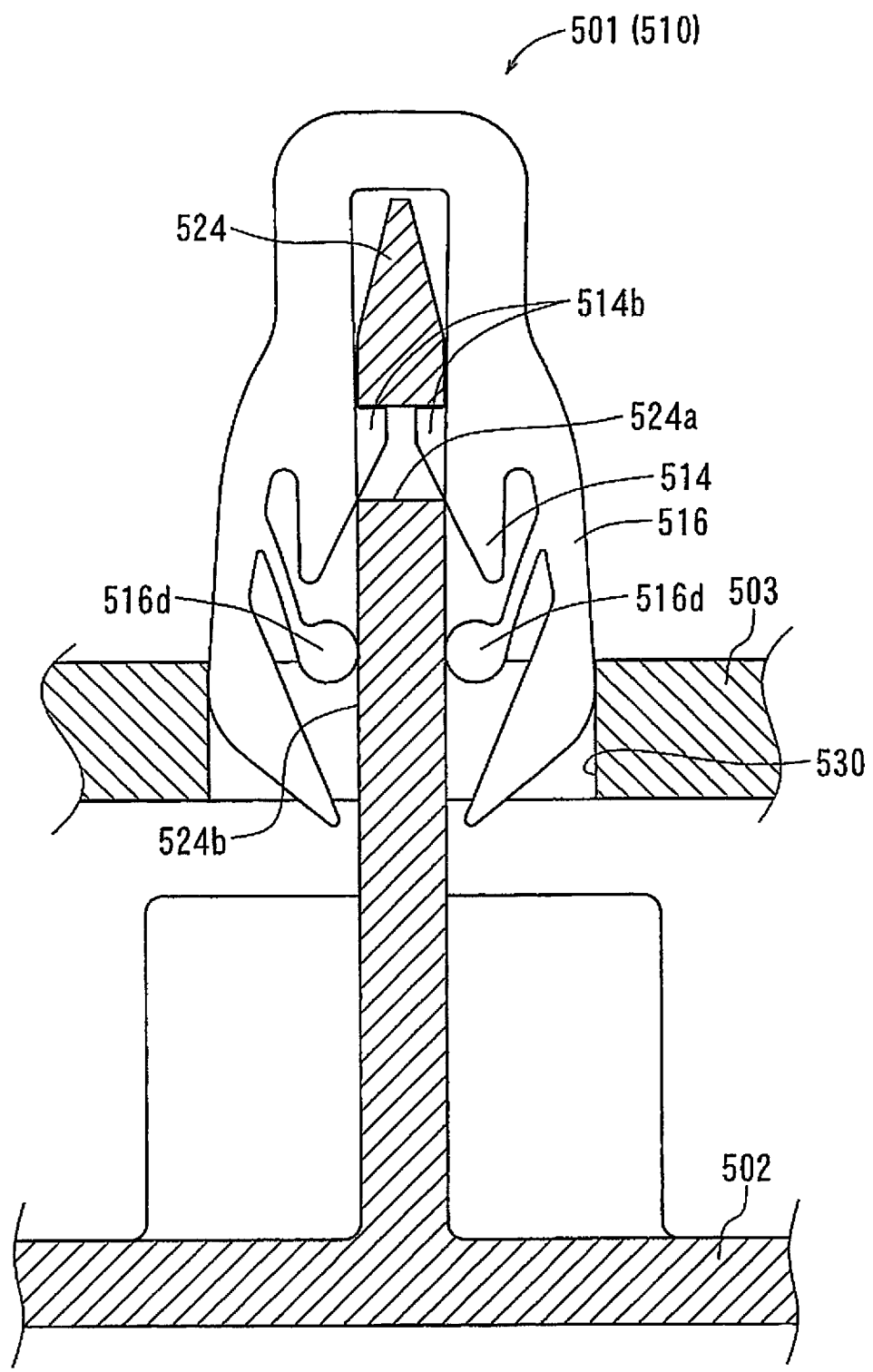
FIG. 18 is a view similar to FIG. 17, which illustrates a condition in which an extraction load is applied to the clip.

The clip 101 of the second embodiment can be modified. That is, as shown in FIG. 13, the clip 101 can be changed to a clip 401 having a clip body 410. In the second modified form, the elastic strips 16*d* and 16*d'* are formed in the inner surface of each of the engagement legs 16*a* so as to be projected downwardly therefrom.

Naturally, various changes and modifications may be made to the embodiments of the present invention without departing from the scope of the invention. For example, in certain embodiments, "the center cluster 2" of the automobile is exemplified as "the attaching article." Further, "the instrument panel 3" of the automobile is exemplified as "the object panel." However, "the attaching article" may be "various interior parts" of the automobile. Further, "the object panel" may be "various panels" of the automobile.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A clip having a clip body configured to be attached to a rib formed in an attaching article and configured to be inserted into an attaching hole formed in an object panel, wherein the clip body comprises a clamping portion configured to be coupled to the rib via an engagement slot formed in the rib, and an engagement portion elastically engageable with the attaching hole, the engagement slot formed in a portion of the rib that is proximal to the attaching article, wherein the engagement portion has a biasing body that is configured to be spaced apart from an outer surface of the rib when the clip body is completely inserted into the attaching hole and configured to elastically contact the outer surface of the rib when the engagement portion is deformed inwardly caused by an extraction load applied to the clip body, and wherein the biasing body is positioned so as to contact the outer surface of the rib in a position closer to an end of the rib that is distal to the attaching article.

2. The clip as defined in claim 1, wherein the engagement portion comprises a pair of engagement legs that are configured to be elastically deformed inwardly and outwardly.

3. The clip as defined in claim 2, wherein the biasing body comprises cantilevered elastic strips that are respectively formed in inner surfaces of the engagement legs.

4. The clip as defined in claim 3, wherein the biasing body comprises additional cantilevered elastic strips that are respectively formed in the inner surfaces of the engagement legs.

5. The clip as defined in claim 2, wherein the biasing body comprises arcuate elastic strips that are respectively formed in the inner surfaces of the engagement legs and respectively be formed as both-end supported strips.

6. The clip as defined in claim 1, wherein the clamping portion comprises a pair of clamping strips that are respectively formed in the engagement legs.

* * * * *